United States Patent [19]

Kellar et al.

[11] Patent Number: 4,774,572
[45] Date of Patent: Sep. 27, 1988

[54] VIDEO SCAN CONVERSION

[75] Inventors: Paul R. N. Kellar; Brian R. G. Nonweiler, both of Newbury; Rodney N. J. Stone, Buriton, all of United Kingdom

[73] Assignee: Quantel Limited, Kenley, United Kingdom

[21] Appl. No.: 811,718

[22] Filed: Dec. 20, 1985

[30] Foreign Application Priority Data

Jan. 7, 1985 [GB] United Kingdom ............... 8500350

[51] Int. Cl.$^4$ ............................................. H04N 7/18
[52] U.S. Cl. .................................. 358/109; 358/102; 358/103; 358/140
[58] Field of Search ............... 358/102, 109, 140, 113, 358/103, 310, 311, 335, 180; 364/521; 360/36.1

[56] References Cited

U.S. PATENT DOCUMENTS

| | | | |
|---|---|---|---|
| 3,810,174 | 5/1974 | Heard et al. | 358/140 X |
| 4,360,876 | 11/1982 | Girault et al. | 358/103 X |
| 4,442,453 | 4/1984 | Verdier | 358/102 X |
| 4,516,156 | 5/1985 | Grainge et al. | 350/109 |
| 4,603,350 | 7/1986 | Albeiter | 358/140 |

OTHER PUBLICATIONS

"Display of Stored Images", Bush et al.; IBM Technical Disclosure, vol. 18, #1, Jun. '75, pp. 272-273.
"An Experimental Landsat Quick-Look System for Alaska", Miller et al., 1981 Machine Processing of Remotely Sensed Data Symposium.

*Primary Examiner*—Howard W. Britton
*Assistant Examiner*—Victor R. Kostak
*Attorney, Agent, or Firm*—Cooper & Dunham

[57] ABSTRACT

A system for converting video signals from a scanner from, for example, an air surveillance system comprising an interface (2) which applies incoming video signals directly to a bulk store (5) and to a scan converter (4). The interface can also apply signals from the bulk store to the scan converter. The signals received from the bulk store can be processed differently from those received directly by the scan converter. This system allows maximum possible resolution of the image to be maintained for zoom in and for roaming.

15 Claims, 1 Drawing Sheet

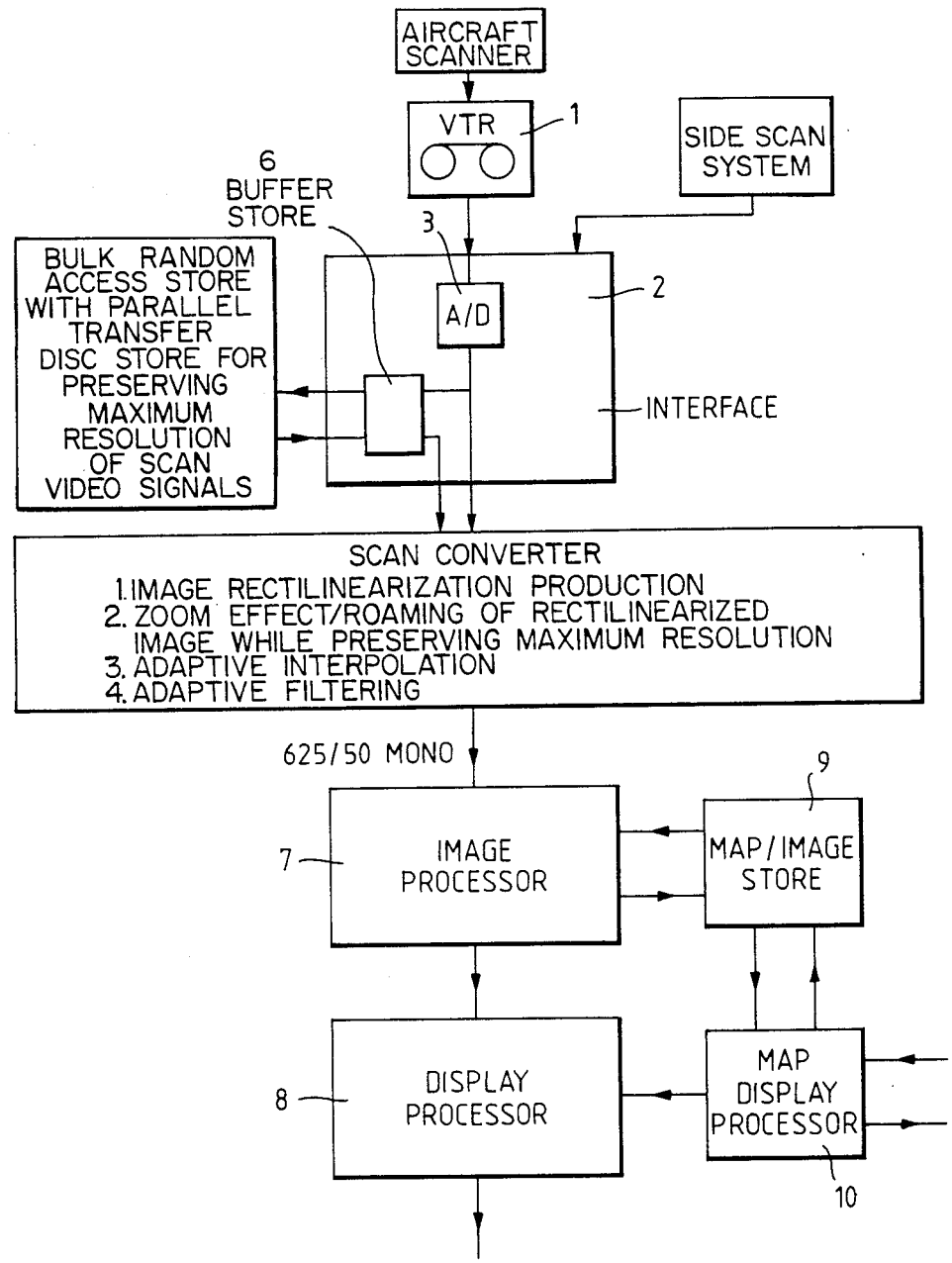

VIDEO SCAN CONVERSION

This invention relates to video scan converting arrangements.

A known form of air surveillance system comprises an infra red line scanner mounted in an aircraft and arranged to scan the terrain over which the aircraft is flying. The scanning takes place from side to side and as the scan progresses the scanner generates video signals which are recorded on video tape from which they can be reproduced for further processing. The video signals are representative of successive strips extending transversely of the flight path. It will be understood that the capacity of the video signals to resolve features of or on the ground will depend on a number of factors, such as the speed and height of the aircraft, usually denoted a the V/H ratio, the instantaneous angle of the scan with respect to the vertical, the attitude of the aircraft and whether ground features are horizontal, inclined, or even vertical, and so on. It is therefore usual to apply the video signals as derived from the video tape, after digitization, to a scan converter which is arranged, by a process known as rectilineation, to convert the line scan video signals into digital signals in TV raster format. This facilitates further processing of the video signals, such as image enhancement, comparison with signals representing maps from a library of maps, display of images of a section of the terrain and so on.

As an aid to analysis of the processed images, the operator may wish to study a large scale image of part of a scene, that is to zoom in on a particular aspect, and may also desire to "roam" over part of the total area swept by the scan. Zooming or roaming can be simulated by further processing of the converted signals, but this has the disadvantage that the scan conversion may have involved the irreversible integration or other weighted combination of individual data signals which would have been advantageous in producing the zoom or roam affect.

The object of the present invention is to provide an improved video scan converter which includes improved processing means, with a view to avoiding or reducing the aforesaid disadvantage.

According to the present invention there is provided a scan converting arrangement comprising a source of line scan video signals, processing means for processing video signals to effect conversion thereof, bulk storage means for storing batches of said video signals, interface means for applying video signals from said source directly to said processing means and also via said storage means to said processing means, and means conditioning said processing means to effect rectilineation of video signals received direct from said source and to differently process video signals received via said storage means.

Preferably said scan converter includes means for processing the video signals received direct from the interface means to produce image rectilineation and said further processing means includes means for processing video signals received via said storage means to give the effect of zooming in on part of or roaming over the rectilinearised image.

According to the invention the bulk storage means is arranged to store the video signals from the input at full resolution, and the maximum possible resolution is preserved when the signals are processed to give the effect of zooming.

The bulk storage means is preferably a parallel transfer disc store arranged so as to provide an average word writing and reading rate comparable with pixel rate at the interface means of the arrangement. The interface means preferably includes buffer storage means for temporarily storing line scan video signals received by the interface means in the course of transfer to the bulk storage means to allow for the time needed to position the heads of a parallel transfer disc store, and also for the need to convert the serial video signal into parallel format for transfer to the bulk storage means and vice versa.

In order that the present invention may be better understood and readily carried into effect, one example thereof will now be described with reference to the single FIGURE of the accompanying drawings which illustrates the said example by means of a block diagram.

Referring to the drawing, reference 1 denotes a video tape recorder/reader (VTR) which it will be assumed is set up to read a tape recording of the video signal output of an infra red line scanner forming part of an airborne surveillance system. The frequency band of the video signal may extend up to, say, 3.5 MHz. The video signals as read by the VTR 1 are applied to an interface means denoted generally by the reference 2. The interface means includes an analogue-to-digital converter 3, which converts the analogue video signals from the line scanner into digital signals. The sampling rate used in the conversion is uniform with respect to the incoming signals and therefore it will be appreciated that the resolution of the digital signals will be dependent on the various factors enumerated in the foregoing part of this specification. The interface means 2 is arranged to apply the digitized video data directly to a scan converter 4 as reading occurs from the VTR 1. However, in addition to feeding the video data live to the scan converter, the interface means also feeds the digitized video data in batches to a bulk store 5 for storage of the video data in, say 60 second segments. This bulk store 5 comprises a random access parallel transfer disc store, which is such that the digital video signals can be written on and read from a plurality of discs in parallel. The number of parallel channels is sufficient to allow video data from the VTR 1 to keep pace with the output signals from the analogue-to-digital converter 3, that is to say at the full resolution of the sensor used in the line scanner. The interface means 2 includes a buffer store 6 to allow the data video signals from the converter 3 to be temporarily stored prior to feeding them in parallel to the bulk store 5, and vice versa. The buffer store 6 also allows time for address selection in the bulk store. The parallel transfer disc store 5 may comprise for example model M 2350A, manufactured by Fujitsu Ltd. of Tokyo, Japan. The buffer store may comprise a plurality of frame stores of the kind commonly used in digital video signal processing circuits. The parallel transfer disc store 5 and the buffer store 6 may be arranged to co-operate together so that the signals may be applied to the scan converter in correct format.

The interface means 2 is arranged to manage writing transfers to the bulk store in such a way, for example, that video signals occurring in, say, the preceding 60 seconds are retained in the bulk store 5, the batch of signals stored in the bulk store being continuously updated. In normal processing of the video signals only the live video signals from the VTR 1 are applied by the interface means to the scan converter 4. The scan converter is arranged in known manner to process these video signals to convert them to a standard television format to facilitate the display on a standard TV type monitor as an image of the terrain over which the aircraft has flown, and/or a running comparison with signals in TV format representing a sequence of maps of the terrain over which the aircraft is flying. This is achieved by the process of rectilinearation, which, as known, involves selective filtering, that is to say integration or other weighted combination of the video signals in selected groups to give a uniform or nearly uniform resolution over the area of a particular image. The processor is controlled by a micro-processor in known manner. The output of the scan converter 4 in this mode of operation is a changing video image of successive areas of the terrain, the dimension of which are determined by the amplitude of the line scan, the height of the aircraft and other factors. This video image is passed out as digital video signal in TV format, providng a mono image of 625 lines at 50 fields per second. It is passed to an image processor 7 arranged to produce image enhancement, such as edge detection, image stretch and so on. The enchanced digital video signals are then passed to a display processor 8 which is arranged to produce comparison with stored digital maps and other effects. The image processor 7 and display processor 8 are of known construction, and need not be further described. The signals representing the stored maps may be read from a map and image store 9, which may include a Winchester disc, and passed to the processor 8 via a map display processor 10. Image signals representing maps produced by the processor 7 can also be passed to the store 9 if desired.

In accordance with the invention, the interface 2 is arranged so that, in response to a control signal, the signals fed to the converter 4 can be derived not directly from the VTR 1 but from the bulk store 5. This control signal is generated when it is desired to produce a zoom and/or a roam effect. When the signal is given the operation of the scan converter 4 is modified to utilise the video signals at full scan resolution from the bulk store 5 in generating signals representing an enlarged and/or roaming view of an aspect of the terrain scanned by the line scanner. The generation of these enlarged view signals is carried out using similar rectilinearation processing to that used in generating the normal images, but the signals from the bulk store 5 are initially processed to enlarge the "scale" of the particular aspect of the field of view to be processed. Such initial processing may include interpolation. The particular aspect which is represented by the enlarged view can of course be selected by the operator. The zoom or roam is not therefore impaired by the incompatible combination or filtering which is carried out in the rectilinearation of the live video signals. To achieve the above described result the scan converter 4 is arranged so that it can carry out adaptive interpolation or filtering which is dependent upon the mode of operation selected at any particular time. Arrangements which are capable of producing such adaptive interpolation or filtering are described for example in British Pat. No. 1,594,341.

The interface means 3 and the scan converter are also arranged in known manner to handle so called side scan video signals derived from the surveillance system. This processing is however known and need not be further described herein. The interface means may also be arranged to separate header data from the video signals derived from the VTR 1 and to pass these to a decoder.

Many other modifications may also be made in the arrangement described. For example, the image processor 7 may be arranged so that other editing effects can be achieved, and the display processor 10 can be arranged to produce symbols overlay, tracking error signals and so on. The reading rate from the parallel transfer discs may be slower than the rate of writing of the signals and this allows greater flexibility of processing. Once the signals have been recorded on the discs the signals may be retrieved at the slow rate or in a format that is difficult to achieve with the tape recorder and the processing of the signals need not be confined to zoom or roam.

We claim:

1. A scan converting arrangement comprising:
   a source of line scan video signals;
   processing means for processing said video signals to effect conversion thereof;
   bulk storage means for storing batches of said video signals;
   interface means for applying video signals from said source directly to said processing means and also via said storage means to said processing means;
   and means conditioning said processing means to effect rectilinearization of video signals received direct from said source and to differently process video signals received via said storage means.

2. A scan converting arrangement comprising:
   a source of line scan video signals;
   processing means for processing said video signals to effect conversion thereof;
   bulk storage means for applying video signals from said source directly to said processing means or via said bulk storage means to said processing means at a different rate from the video signals from said source;
   and means for conditioning said processing means to differently process video signals received from said source directly or via said storage means.

3. A scan converting arrangement comprising:
   a source of line scan video signals;
   processing means for processing said video signals to effect conversion thereof;
   bulk storage means for storing batches of said video signals;
   interface means for applying video signals from said source directly to said processing means or via said storage means to said processing means in a different format from the video signals from said source;
   and means for conditioning said processing means to differently process video signals received from said source directly or via said storage means.

4. A video scan converting arrangement comprising:
   a source of line scan video signals;
   bulk storage means for storing batches of said video signals;
   a scan converter;
   and interface means including means for applying said line scan signals from said source directly to said scan converter and via said storage means to said scan converter;
   said scan converter including means for processing the video signals received direct from the interface means to produce image rectilinearization and for processing video signals received via said storage means to give the effect of zooming in on part of or roaming over the rectilinearized image.

5. A video scan converting arrangement as in claim 4 wherein:
said bulk storage means stores said line scan video signals at full resolution and said scan converter includes means to preserve the maximum possible resolution when the signals are processed to give the effect of zooming or roaming.

6. An arrangement in claim 4 wherein said bulk storage means is a parallel transfer disc store which operates to provide an average writing and reading rate comparable with the pixel rate at the interface means.

7. A scan converting arrangement as in claim 6 wherein said interface means includes buffer storage means for temporarily storing line scan video signals received by the interface means in the course of transfer to the bulk storage means.

8. A video scan converting arrangement as in claim 4 further comprising, image processor means for processing the video signals from said scan converter means to produce an enhanced image.

9. A video scan converting arrangement as in claim 4 wherein said scan converter means includes means for carrying out adaptive interpolation or adaptive filtering dependent on the mode of operation.

10. A video scan converting arrangement as in claim 4 wherein:
said interface means receives signals from a side scan system; and
said scan converter includes means for processing said side scan signals.

11. A method of converting video signals from a scanner comprising:
receiving signals from said scanner and applying these signals to bulk storage means and to a scan converter;
processing the signals applied direct to the scan converter to produce an image in a format suitable for display;
applying signals from said bulk storage means to said scan converter and processing these signals to give the effect of a zoom in on part of the image.

12. A method as claimed in claim 11 wherein said zoom processing is carried out in a manner which preserves the maximum possible resolution.

13. A scan converting arrangement for video signals from an air surveillance system comprising:
store means for video signals from a scanner mounted in an aircraft;
interface means including an analogue-to-digital converter which receives said video signals from the store means and generates corresponding digital video signals;
bulk storage means;
and scan converter means;
said interface means further including means for applying said digital video signals to said bulk storage means and means applying said digital video signals to said scan converter means;
and means for applying signals from said bulk storage means to said scan converter means;
said scan converter means including means for producing signals representing a rectilinearized image from said video signals received direct from the interface means and means for processing the video signals received from the bulk storage means to produce the effect of a zoom in on part of the image.

14. A scan converting arrangement as in claim 13 further comprising, image processor means for processing signals from said scan converter means to produce an enhanced image.

15. An arrangement as in claim 14 further comprising, store means for digital signals representing a map, processor means for processing signals received from said image processor to provide comparison with maps with said map store means.

* * * * *